United States Patent
Banin et al.

(10) Patent No.: US 8,471,969 B2
(45) Date of Patent: Jun. 25, 2013

(54) OPTICAL DISPLAY DEVICE AND METHOD THEREOF

(75) Inventors: Uri Banin, Mevasseret Zion (IL); Volker Hilarius, Gross-Umstadt (DE); Assaf Aharoni, Tel Aviv (IL); Hagai Arbell, Mevasseret Zion (IL)

(73) Assignees: Merck Patent GmbH, Darmstadt (DE); Yissum Research Development Co., Jerusalem (IL)

( * ) Notice: Subject to any disclaimer, the term of this patent is extended or adjusted under 35 U.S.C. 154(b) by 122 days.

(21) Appl. No.: 13/202,871

(22) PCT Filed: Feb. 23, 2010

(86) PCT No.: PCT/IL2010/000151
§ 371 (c)(1), (2), (4) Date: Aug. 23, 2011

(87) PCT Pub. No.: WO2010/095140
PCT Pub. Date: Aug. 26, 2010

(65) Prior Publication Data
US 2011/0299001 A1    Dec. 8, 2011

Related U.S. Application Data

(60) Provisional application No. 61/202,356, filed on Feb. 23, 2009.

(51) Int. Cl.
*G02F 1/1335* (2006.01)
(52) U.S. Cl.
USPC .......................................................... 349/17
(58) Field of Classification Search
USPC ..................................................... 349/17, 25
See application file for complete search history.

(56) References Cited

U.S. PATENT DOCUMENTS

| 5,537,000 A | 7/1996 | Alivisatos et al. |
| 6,939,604 B1 | 9/2005 | Guyot-Sionnest et al. |

(Continued)

FOREIGN PATENT DOCUMENTS

| EP | 1 909 134 A2 | 4/2008 |
| EP | 2 262 271 A1 | 12/2010 |

(Continued)

OTHER PUBLICATIONS

Rizzo, A., Nobile, C., Mazzeo, M., De Giorgi, M., Fiore, A., Carbone, L., Cingolani, R., Manna, L., Gigli, G., "Polarized Light Emitting Diode by Long-Range Nanorod Self-Assembling on a Water Surfaces", *ACS NANO*, American Chemical Society, 2009, (3), No. 6, 1506-1512.

(Continued)

*Primary Examiner* — Phu Vu
(74) *Attorney, Agent, or Firm* — Frommer Lawrence & Haug LLP; William S. Frommer

(57) ABSTRACT

The present invention provides and optical display device and a method for use in displaying an image. The optical display device comprises An optical display device comprising: at least one region of nanostructures operable as an optically active media, such that said nanostructures are responsive to input electromagnetic radiation to emit output electromagnetic radiation, and an arrangement of electrodes being configured and operable to be selectively addressable to create an external electric field to said at least one region of nanostructures, said region of nanostructures and said arrangement of electrodes defining together a pixel arrangement of said display device; said external electric field affecting said at least one region of nanostructures to selectively modulate emission of said output electromagnetic radiation, said output electromagnetic radiation being an output of at least one pixel element of the display device.

25 Claims, 14 Drawing Sheets

U.S. PATENT DOCUMENTS

| | | |
|---|---|---|
| 7,200,318 B2 | 4/2007 | Banin et al. |
| 2008/0088225 A1 | 4/2008 | Weiss et al. |
| 2008/0128761 A1 | 6/2008 | Banin et al. |
| 2008/0204383 A1 | 8/2008 | McCarthy et al. |
| 2009/0046222 A1 | 2/2009 | Miner et al. |
| 2009/0230382 A1 | 9/2009 | Banin et al. |

FOREIGN PATENT DOCUMENTS

| | | |
|---|---|---|
| WO | WO 2005/075339 A2 | 8/2005 |
| WO | WO 2006/134599 A1 | 12/2006 |
| WO | WO 2010/095140 | 8/2010 |
| WO | WO 2012/059931 A1 | 5/2012 |

OTHER PUBLICATIONS

Hu, J, Li, L., Yang, W., Manna, L., Wang, L., Alivisatos, A. P., "Linearly Polarized Emission from Colloidal Semiconductor Quantum Rods", *Science*, Jun. 15, 2001, (292), 2060-2063.

Banin, et al. 2002. "Lasing from Semiconductor Quantum Rods in Cylindrical Microcavity", *Advanced Materials*, 14(4): 317-321.

Banin, et al. 2005. "Electric Field Induced Switching of the Fluorescence of Single Semiconductor Quantum Rods", *Nano Letters*, 5(8), 1581-1586.

Bawendi, et al. 2002. "Reversible Charging of CdSe Nanocyrstals in a Simple Solid-State Device". *Advanced Materials*, 14(15): 1068-1071.

OPTICAL DISPLAY DEVICE AND METHOD THEREOF

This application claims priority from U.S. National Phase of International Patent Application Number PCT/IL2010/000151, filed Feb. 23, 2010, claiming benefit under 35 U.S.C. 119 of U.S. Provisional Application Number 61/202,356, filed Feb. 23, 2009.

FIELD OF THE INVENTION

This invention relates to optical devices such as displays using semiconductor nanoparticles.

REFERENCES

1. US patent application 2008/0088225;
2. Banin et al., Adv. Mater., (2002) 14, 317;
3. Banin et. al., Nano Letters., (2005) 5, 1581;
4. Bawendi et. al, Advanced Materials, (2002) 14, 1068;
5. U.S. Pat. No. 5,537,000;
6. U.S. Pat. No. 7,200,318;
7. International application number WO 05075339 or US application no. 2008/0128761;
8. International application number WO 06134599 or US application no. 2009/230382 derived therefrom.

BACKGROUND OF THE INVENTION

Flat-screen displays are widely used in a great variety of applications such as computers, mobile phones and television sets. A prominent segment of these displays is that of liquid crystal displays (LCDs). LCDs are based on back illuminated screens, with multiple layers of different optically active films, at least one of which being a liquid crystal layer. Light transmission from each pixel can then be controlled and modulated by changing the polarization state of the liquid crystal.

Semiconductor nanocrystals relate to a class of nanomaterials with properties that are widely tunable by controlling particle size, composition and shape. Among the most evident size dependent properties of this class of materials is the tunable fluorescence emission. The tunability is afforded by the quantum confinement effect, where reducing particle size leads to a 'particle in a box' behavior, resulting in a blue shift of the band gap energy and hence the light emission. For example, in this manner, the emission of CdSe nanocrystals can be tuned from 660 nm for particles of diameter of ~6.5 nm, to 500 nm for particles of diameter of ~2 nm. Similar behavior can be achieved for other semiconductors when prepared as nanocrystals, allowing for broad spectral coverage from the UV (using ZnSe, CdS for example) throughout the visible (using CdSe, InP for example) to the near-IR (using InAs for example). The use of semiconductor nanostructures for color tuning of the LC display have been suggested in [1].

Changing the nanocrystal shape was demonstrated for several semiconductor systems, with the most prominent shape being the rod shape. Nanorods show properties that are modified from the spherical particles. For example, the nanorods exhibit emission that is polarized along the long rod axis, while spherical particles exhibit unpolarized emission. Moreover, nanorods have advantageous properties in optical gain, suggesting their potential use as laser materials as shown for example in [2]. The emission from a single nanorod was also demonstrated to be switched on and off, reversibly, under an external electric field, as described for example in [3].

An attractive property of colloidal semiconductor nanoparticles is their chemical accessibility, permitting their processing in various diverse means. The particles may be deposited from solution, spin coated or deposited in films, embedded in plastics and more.

GENERAL DESCRIPTION

There is a need in the art for a novel optical display, enabling larger, as well as brighter, screens with better contrast and improved viewing angles in comparison with standard optical displays.

According to one broad aspect of the present invention, there is provided an optical display device comprising: at least one region of nanostructures operable as an optically active media, such that said nanostructures are responsive to input electromagnetic radiation to emit output electromagnetic radiation, and an arrangement of electrodes being configured and operable to be selectively addressable to create an external electric field to said at least one region of nanostructures, said region of nanostructures and said arrangement of electrodes defining together a pixel arrangement of said display device; said external electric field affecting said at least one region of nanostructures to selectively modulate emission of said output electromagnetic radiation, the modulated output electromagnetic radiation being an output of at least one pixel element of the display device, said pixel arrangement carrying out selective wavelength conversion and spatial modulation of the input electromagnetic radiation at a specific addressed pixel in accordance with an image to be displayed.

Thus, the present invention enables the use in an optical display a media that is optically active and is formed by emitting nanoparticles/nanostructures. This enables the optical display to be of a larger size and of fewer layers, and also enables the construction of brighter screens with better colors and improved viewing angles in comparison with standard optical displays.

In particular, there is provided an optical display device using emitting nanoparticles, excitable by (responsive to) input electromagnetic radiation enabling switching on and off of nanoparticles between operative and inoperative states. As used herein, the operative state refers to the state of excitation of the nanostructures (after illumination) and the subsequent emission of electromagnetic radiation by the nanostructures characterizing the optically active media. The active media is affectable by an external electric field such that, when the nanoparticles are in an operative state, a selective modulation of nanoparticles emission is provided.

In some embodiments, the display device comprises a plurality of nanoparticles arranged/assembled between an arrangement of conductive electrodes that are addressable by voltage supply, thus enabling pixel addressing.

The term "active media" is meant to denote a media capable of interacting with electromagnetic radiation resulting in absorption of the radiation, producing a beam of optical radiation by stimulating electronic, ionic, or molecular transitions to higher energy levels, so that when they return to lower energy levels they generate energy that is emitted.

It should be understood that the term "addressable electrode" refers to the creation of a local electric field, affecting a specific region, which constitutes a pixel of the display, which affecting of the specific region can thus occur in a controlled manner, while not affecting other regions of the device. This allows for effecting modulation of the uniquely identifiable nanoparticles region when in an operative state.

The display device may be a flat screen display using the nanoparticles as direct emitting entities, excited, for example, by back or front illumination (e.g., UV or visible light such as blue but other colors are also possible). Tuning the nanoparticle size and/or material composition provides the required colors for the color display.

It should be noted that, as suggested in [1] in which semiconductor nanostructures where used for color tuning of the LC display, backlight is modulated (and not the emission of the nanoparticles). This technique utilizes liquid crystals for backlight modulation. In such systems, pixel addressing is performed by backlight illumination of an array of pixel elements being a complicated and expensive arrangement. In the present invention, however, the emission modulation is achieved by applying an external electric field on the nanoparticles. The applied external field may lead to quenching of the fluorescence emission, affecting the luminescence intensity of the display, due, for example, to induced electron-hole separation in space (i.e. charge separation).

After the application of the external electric field, the nanoparticles remain uncharged. This is contrary to previous observations [4] indicating that charge injection results in the production of charged nanoparticles. In fact, the technique of the present invention does not require a charge injection approach which is typically a complex approach, as have been shown with respect to nanocrystal LEDs, as reported for example in [5] and [6].

The nanoparticles pixel arrangement of the present invention can thus be illuminated by a backlight (UV or VIS), resulting in an excitation of the nanoparticles causing generation of photons, the emission of which can be controlled. This emission is the output of the display device. The present invention enables the modulation of this emission at each pixel. An image can thus be displayed by applying voltage onto the electrodes.

The term "nanostructure/nanoparticle" refers to any discrete entity having at least one dimension of a submicron size, preferably smaller than 100 nm and preferably having as its largest dimension (length) a size of less than few μm, more preferably less than 400 nm, or less than 100 nm. Each of the nanoparticles may be of any geometrical shape, symmetrical or unsymmetrical. Non-limiting examples of such geometrical shapes include elongated, rod-like shape, round (spherical), elliptic, pyramidal shape, disk-like, branch, network or any irregular shape etc. In some embodiments, the nanoparticles are quantum dots or quantum rods.

A specific example of such nanoparticles is the elongated nanoparticle (termed nanorods), each being composed of a semiconductor material (including one or more semiconductors). In some embodiments, the semiconductor (SC) nanorods which may be employed are those having a metal or metal alloy region at one or both of their ends. Examples of such elongated SC/metal nanoparticles and their manner of production is given, for example, in [7] incorporated herein by reference. Other possible metal nanoparticles are disclosed, for example, in [8] which is also incorporated herein by reference.

In some embodiments, the nanostructures are colloidal semiconductor nanostructures, or colloidal semiconductor heterostructures including core/shell heterostructures, nanorods, seeded rods, dots, core/multishell dots, and core/shell dots or rods. In some embodiments, the semiconductor nanostructure is a heterostructure of at least two different semiconductors in a core/shell configuration having at least one shell. The heterostructure may be selected from the following configurations: a first semiconductor material or alloy thereof, shaped like a dot and located inside at least one shell having an elongated shape and being made of a different semiconductor material or alloy thereof.

In some embodiments, the nanostructures employed are semiconductor nanostructures of a semiconductor material selected from elements of Group II-VI, Group III-V, Group IV-VI, Group III-VI, Group IV semiconductors and alloys and/or combinations thereof.

In some embodiments, the semiconductor material is a Group II-VI material being selected from CdSe, CdS, CdTe, ZnO, ZnSe, ZnS, ZnTe, HgS, HgSe, HgTe, CdZnSe and any combination thereof.

In some embodiments, Group III-V material are selected from InAs, InP, InN, GaN, InSb, InAsP, InGaAs, GaAs, GaP, GaSb, AlP, AlN, AlAs, AlSb, CdSeTe, ZnCdSe and any combination thereof.

In some embodiments, the semiconductor material is selected from Group IV-VI, the material being selected from PbSe, PbTe, PbS, PbSnTe, $Tl_2SnTe_5$ and any combination thereof.

In some embodiments, the nanostructures are selected amongst composite structures and core/shell structures of the above semiconductors.

In some embodiments, the at least one region of nanostructures comprises nanostructures selected among anisotropic, isotropic nanoparticles and mixtures thereof.

In some embodiments, the anisotropic nanostructures are arranged in a pre-defined orientation with respect to each other (e.g. aligned). Moreover, the nanostructures may be aligned with respect to the electric field vector generated between the electrodes. The orientation may be such that the nanostructures are aligned substantially parallel or perpendicular to the electric field vector generated between the electrodes. Other arrangements are also possible.

In some embodiments, at least one of the nanostructures composing the nanostructure region is selected to be capable of undergoing charge separation.

The nanoparticles or a plurality thereof used in the device of the invention may have at least one asymmetrical property affecting the emitted output electromagnetic radiation. The asymmetrical property may be at least one of asymmetric geometrical shape and heterogeneous material distribution. The asymmetrical property may be achieved by appropriately configuring the geometrical design of the nanoparticles, for example, to provide nanoparticles having an elongated structure forming rod-like geometrical shapes, i.e., nanorods. Such nanorods may have the ability to respond to the input electromagnetic radiation by emitting polarized photon radiation.

In other embodiments, the asymmetrical property is reflected in an unsymmetrical (heterogeneous) composition of nanoparticle, having one region composed of a first material (such as semiconductor material) and another region composed of a second material (such as metal or a second type of semiconductor).

In some embodiments, the arrangement of electrodes may be in plane. This includes different conductive electrode (made of e.g., Au, Pt, Al, ITO or other conducting materials) configurations patterned on one plane. The nanoparticles may be deposited such that they occupy also the region between the electrodes. The conductive electrodes may be patterned on the substrate (for example glass, silicon, plastic) by using, for example, optical lithography, e-beam lithography, evaporation methods, electrochemical methods or soft-lithography, so as to define pixels.

In some embodiments, the arrangement of electrodes comprises a pair of electrically conductive layers. At least one of the electrically conductive layers may be'patterned to define an array of spaced-apart electrodes corresponding to an array of pixels. The conductive electrodes (made of e.g., Au, Pt, ITO or other materials) may be patterned on a substrate and the nanoparticles may be deposited in between them in a pre-defined arrangement. The conductive electrodes may be patterned on the substrate (for example glass, silicon, plastic) by using, for example, optical lithography, e-beam lithography, evaporation methods, electrochemical methods or soft-lithography, so as to define pixels.

In some embodiments, the pixel arrangement comprises an array of spaced-apart nanostructures-containing regions, each may differ from neighboring regions by a wavelength of the generated output radiation. The make-up of each of the nanostructures-containing region may differ from neighboring regions by at least one of the followings: size, material composition and geometrical shape of the nanostructures resident in the region. Color tuning is possible through size, shape and composition control of the nanoparticles deposited in each pixel.

In some embodiments, the emitting nanoparticles are selected from CdSe/CdS rods, ZnSe/CdS rods, CdSe rods, CdSe dots, CdSe dots within a CdS rod (seeded rod), ZnSe dot within a CdS rod (seeded rod), CdSe/CdS/ZnS core/multishell dots, InP dots or rods, InP/ZnSe core/shell dots or rods, ZnSe dots or rods, GaP dots or rods and others.

In some embodiments, the emitting nanoparticles are deposited in a pre-defined arrangement (e.g., predetermined alignment) between the electrodes using, for example, electric field induced self assembly, slow evaporation or other methods. In this connection, it should be noted that slow evaporation is a technique in which a substrate is dipped in a solvent containing the nanoparticles. The solution then slowly evaporates leaving rods aligned on the surface of the substrate. The rods align in ribbons with their long axis in the same direction of solution surface decent.

As disclosed hereinabove, the display device comprises at least one pixel. Color is obtained by three pixels in close proximity, each pixel containing different nanoparticles emitting at the red (for example CdSe dots, CdSe rods, CdSe dot in CdS rod, ZnSe dot in CdS rod, CdSe/ZnS rods, InP dots, InP rods, CdSe/CdS rods, ZnSe/CdS . . . ), green (CdSe dots, CdSe rods, CdSe/ZnS rods . . . ) and blue (ZnSe, ZnS, ZnSe/ZnS core/shell dots or rods, CdS . . . ). Other color basis may also be realized as needed and more than three pixels of different colors in close proximity could also be used.

Additional layers (filters, polarizer's . . . ) may be added on top of the active media (the region containing the nanoparticles) according to the display requirements.

In some embodiments, the display device additionally comprises a liquid crystal (LC) arrangement located at electromagnetic propagation output of the pixel arrangement, configured and operable to modulate transmission of the modulated photon emission from the at least one region of nanostructures. The region of nanostructures is then operable as a polarized or not polarized light source for the LC arrangement.

In some embodiments, the LC arrangement (at least one polarizer of the LC arrangement) is positioned according to the polarization direction of the generated output electromagnetic radiation to appropriately module the emission.

When the nanostructures are aligned with a specific orientation, the first polarizer of the LC arrangement (facing the generated output electromagnetic radiation) is not needed, improving the efficiency (brightness and excitation losses) of the display device.

The display device comprises a pixel arrangement formed by an array of pixel elements, each pixel element including a nanostructures-containing region. The nanostructures-containing region differs from the neighboring regions by at least one of the followings: size, material composition and geometrical shape of the nanostructures resident in said region. Each nanostructures-containing region differs from neighboring regions by a wavelength of the generated output radiation, said pixel arrangement being operable as a polarized pixelized light source of said LC arrangement.

The display device may also comprise, on top of the nanoparticles region (i.e. between the nanoparticles region and the arrangement of the liquid crystals), layers comprising at least one of a polarizer(s), liquid crystal(s), a structured electrode(s) and a color filter(s).

It should be noted that where regions of the elongated nanostructures are aligned with a specific orientation with respect to each other, they may emit a polarized emission eliminating the need for a polarizer placed in front of the backlight. Conventionally, a polarizer placed in front of the backlight causes losses of more than 50% in unpolarized backlight intensity, therefore, using the same intensity of backlight, the display output is much brighter. Moreover, as the nanoparticles are directly excited by the backlight, a more efficient use of the excitation light is provided.

Emitting nanoparticles of various types, as disclosed hereinabove, may be deposited in a pre-defined arrangement, for example, between the electrodes using, for example, electric-field induced self-assembly, slow evaporation or other methods. Elongated nanostructures are thus deposited aligned in a specific direction.

In some embodiments, the nanoparticle pixel arrangement is illuminated by a backlight (UV or VIS), resulting in an excitation of the nanoparticles inducing photon emission. This emission is the output of the display device. Modulating this emission at each pixel is controllable. An image can thus be displayed by blocking or partially blocking the emission by LC light control principle based on polarization change.

In other embodiments, the nanoparticles pixel arrangement is illuminated by (UV or VIS) frontlight (from the front side), and a light diffuser (i.e. distribution layer) is placed on the backside nanoparticle pixel arrangement for distributing the light onto the active media region. The distribution layer may be coated with a light reflector.

The present invention also provides a flexible display based on such nanoparticles.

According to another broad aspect of the present invention, there is provided a method for use in displaying an image. The method comprises providing nanostructures capable of emitting electromagnetic radiation with a predetermined number of wavelength ranges upon excitation by certain input electromagnetic radiation; exciting the nanostructures by the input electromagnetic radiation to thereby generate the electromagnetic radiation of the predetermined number of wavelength ranges; selectively applying an external electric field to at least a region of the nanostructures thereby selectively enabling modulation of the generated electromagnetic radiation, thus providing modulation of the input electromagnetic radiation at a specific addressed pixel in accordance with an image to be displayed.

In some embodiments, the nanostructures are excited by illuminating the nanostructures by the input electromagnetic radiation using back illumination.

In some embodiments, at least one of the following parameters of the nanostructures is selected: size, shape and material composition, to thereby enable the generation and emission with the certain wavelength range in each pixel.

In some embodiments, the method comprises selectively applying an external electric field affecting at least a region of nanostructures. The external electric field is selected from a DC (direct current, as known in the art) or AC (alternating current, as known in the art) electrical signals/voltage affecting the region of nanostructures. Applying the AC voltage to the at least one region of nanostructures may comprise controlling frequency and waveform parameters of the AC voltage, such as applying an AC voltage having a square-like or a sinusoidal waveform. As known, the AC voltage refers to a voltage continually changing between positive (+) and negative (−) values.

In some embodiments, the method comprises periodically modulating the amplitude of the input electromagnetic radiation versus time. The method may further comprise synchronizing the period of the modulated input electromagnetic radiation with the period of the AC voltage.

In some embodiments, the nanostructures are selected to be capable of charge separation in response to the excitation and the application of the field. At least one of geometrical shape and heterogeneous material composition of the nanostructures may be appropriately configured to provide nanostructures having asymmetrical property such as providing at least one of the nanostructures having a rod-like geometrical shape.

The electric field may be applied by operation of at least one region of electrodes enclosing the nanostructures between them. The region of electrodes may be provided by patterning a substrate to form at least one array of spaced-apart electrodes corresponding to an array of pixels.

In some embodiments, emitting nanostructures of various types are deposited in a pre-defined arrangement between the electrodes.

In some embodiments, the method comprises selecting at least one of the following parameters of the nanostructures: size, shape and material composition, to thereby enable said generation and emission with said certain wavelength range in each pixel.

In some embodiments, the method comprises selecting different groups of nanostructures emitting at respectively the red wavelength range, the green wavelength range and the blue wavelength range, each group forming a different pixel and arranging at least three pixels in close proximity.

In some embodiments, the method comprises providing a polymer carrier surrounding the nanostructures by encapsulating the nanostructures with a polymer and/or molding the polymer on the nanostructures.

According to another aspect of the present invention, there is also provided an optical display device comprising at least one region of nanostructures operable as an optically active media, said nanostructures being anisotropic; said nanostructures are arranged in said region in a pre-defined orientation, such that said nanostructures are responsive to input electromagnetic radiation to emit output polarized electromagnetic radiation, said output polarized electromagnetic radiation being an output of at least one pixel element of the display device; and a liquid crystal (LC) arrangement located at propagation of the electromagnetic radiation output of said at least one pixel element, said LC arrangement being configured and operable to modulate transmission of the polarized electromagnetic radiation from said region of nanostructures and to thereby induce modulation of the polarized photon emission (e.g. nanoparticle fluorescence modulation). For example, the polarized emission emitted by the nanorods may be blocked by the liquid crystal layer.

Alternatively, the anisotropic nanostructures are not arranged in a pre-defined orientation and therefore the output electromagnetic radiation is not polarized. In this case, the system further comprising a polarizer polarizing the output polarized electromagnetic radiation emitted from the nanostructures.

According to another broad aspect of the present invention, there is provided a method of alignment of nanostructures. The method comprises providing a plurality of the nanostructures between two substrates; applying an AC or DC external field of a predetermined field vector in a region between the substrates to thereby arrange the nanostructures with a specific orientation with respect to the electric field vector.

In some embodiments, the substrates are associated with electrically conductive layers. At least one of the electrically conductive layers may be patterned to form at least one array of spaced-apart electrodes corresponding to an array of pixels.

The method may further comprise interacting the nanostructures with at least a region of the substrate. The nanostructures may be deposited on the region of the substrate. The substrate may be wetted with a solution containing the nanostructures and a solvent. The solvent may then be evaporated while optionally applying an electric field, thereby bringing about alignment of the nanostructures on the surface of the substrate.

In other embodiments, applying an external electric field on the spaced-apart electrodes comprises applying a DC voltage or an AC voltage. The frequency and waveform parameters of the AC voltage may be controlled by applying for example an AC voltage having a square-like waveform.

In some embodiments, the elongated nanoparticles are aligned parallel to the electric field lines. This is achieved, for example, by self assembling nanorods under an external electric field, by slow evaporation or by employing other suitable techniques. Use of alignment layers or mechanical alignment is also possible. For example, a mechanical alignment may be provided by gently rubbing a film of nanoparticles with a velvet cloth. The nanoparticles align with the direction of the rubbing.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 2B is an enlargement of three pixels from the middle active media;

FIG. 5A is a SEM image of 90 nm CdSe dots within CdS rods nanoparticles aligned between two gold electrodes; FIG. 5B is a SEM image of 40 nm CdSe rods aligned between two gold electrodes using solvent evaporation;

FIG. 7B represents a fluorescence image of measurements 7 and 8;

DETAILED DESCRIPTION OF EMBODIMENTS

Figure 1A:
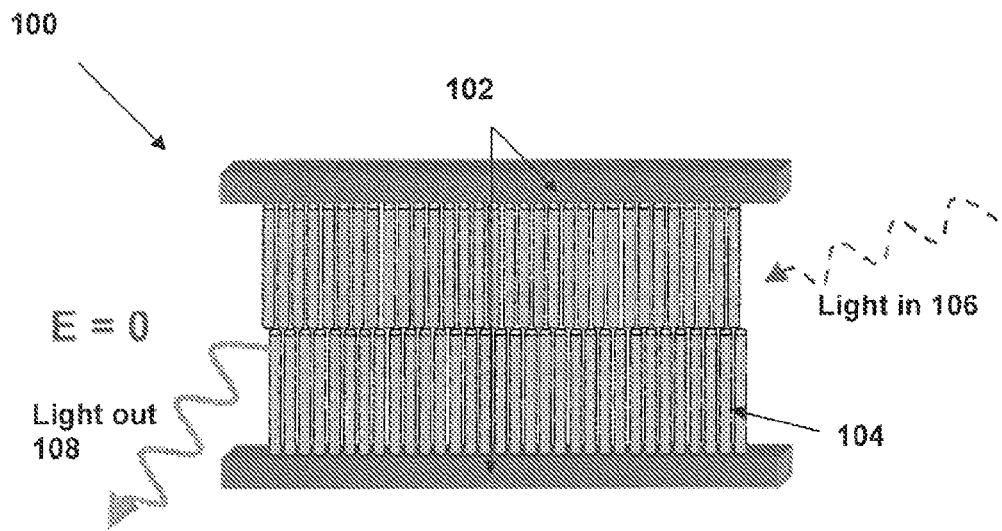
FIGS. 1A-1B are schematic illustrations of the operation of one pixel in the display device of the present invention before and after application of an external electric field on the display device.
Figure 1B:
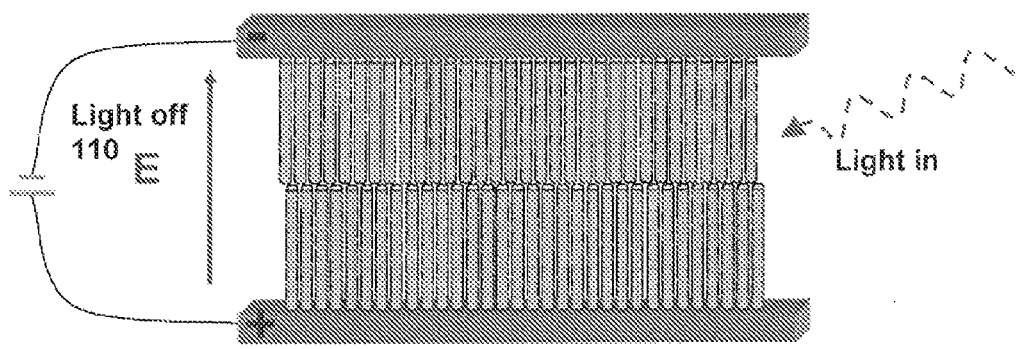

Reference is made to FIGS. 1A-1B, illustrating a general schematic illustration of the display device and operation thereof according to the teachings of the present invention. In this, specific figure, one-pixel optical display device 100 is represented; however, it should be understood that this may constitute a pixel of the multi-pixel arrangement used in an optical display device.

The optical display device 100 comprises an optically active media of nanostructures 104 positioned between two electrically conductive layers 102 defining an arrangement of electrodes. The optically active media of nanostructures 104 is responsive to input electromagnetic radiation (e.g. illumination) 106 to generate output electromagnetic radiation 108 (photon radiation). An external electric field E (e.g. as a result of voltage supply to the electrodes arrangement) is applied between the pair of electrodes 102 which modulates and can also quench (i.e. switch off) the emission from the nanostructures as illustrated in FIG. 1B. The external electric field vector E between the electrodes is indicated by a black arrow. The application of the external field may lead to quenching of the fluorescence emission due, for example, to induced electron-hole separation in space (an effect which is herein termed "charge separation"). This process has a significant effect on the luminescence intensity.

As described above, the display device of the present invention uses nanostructures as direct emitting entities, excited for example by back or front light (e.g. UV or visible light). Tuning the nanoparticle size and composition provides the required colors for the color display. Moreover, where the nanoparticles are elongated in structure, for example in the form of nanorods, they may be aligned to achieve or tune the color modulation effect. In some embodiments, the nanoparticles are arranged in a pre-defined fashion with respect to the electric field between the electrodes, for example they are aligned parallel or perpendicular to the electrodes. Other arrangements are also possible.

Emitting nanoparticles of various types (for example CdSe/CdS rods, ZnSe/CdS rods, CdSe rods, CdSe dots, InP dots or rods etc.) may be deposited in a pre-arranged manner, for example, between the electrodes using, for example, electric field induced self assembly, slow evaporation or other methods. The nanostructures may be deposited aligned in a specific direction. The nanoparticles in the pixel are illuminated by input electromagnetic radiation (e.g. a backlight UV or VIS). The input electromagnetic radiation creates an excitation in the optically active media that relaxes by photon emission. This emission is the output from the display device.

The display device may comprise in addition to the region of the optically (excitable) active media of nanostructures, one or more of such elements as polarizers, liquid crystals, structured electrodes and color filters layers. These additional elements are located on top of the nanostructures containing region to be in the optical path of the radiation emitted by the nanostructures.

Figures 2A, 2B:
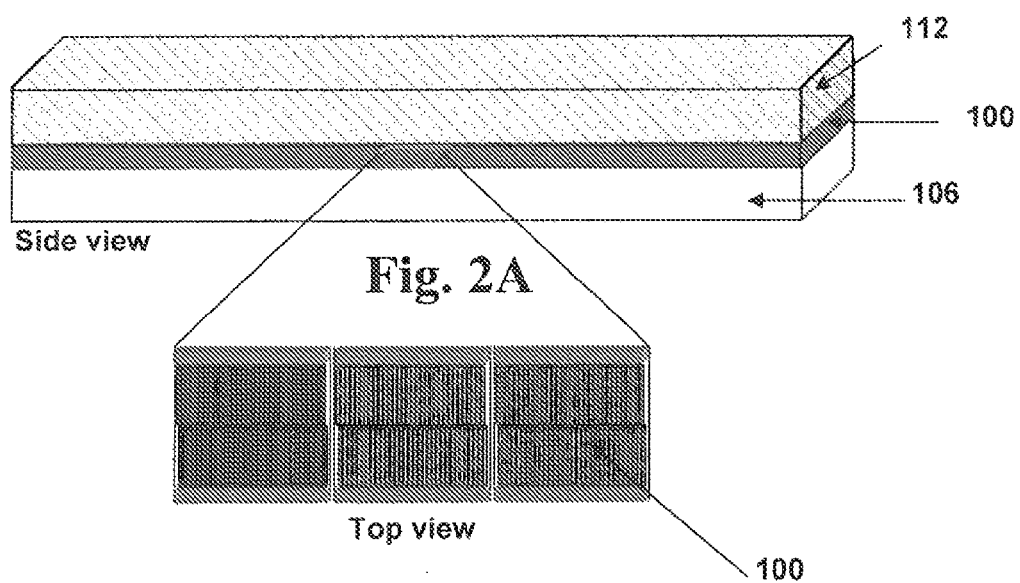
FIGS. 2A-2B are schematic illustrations of a general structure of the display device. In particular.

Reference is made to FIGS. 2A-2B illustrating a general side view of the display device and operation thereof. Layer 106 represents the illuminator to which the active media of the display device 100 is exposed. This may be a light source itself or an optical window transmitting input electromagnetic radiation. The light source generating the input electromagnetic radiation may be a part of the system. Alternatively an external light source may be used with the system of the present invention. The display device 100 is thus accommodated between the illuminator and additional one or more elements 112, such as filters and/or a liquid crystal layer used in some embodiments of the present invention, as will be described further below. The display device 100 includes the nanostructures active media region and the electrodes. FIG. 2B is an enlargement of a portion of the display 100 formed by three-pixel arrangement. The pixel arrangement portion includes three spaced-apart pixels (i.e. cells) emitting at different colors (these is a typical arrangement of RGB sub-pixels of a display pixel; the number of such sub-pixels may vary in accordance with a desired color composition). The variety of nanoparticles used in this application covers the entire visible spectrum and if an NIR (near infra red) display is desired, also NIR range. In this specific example, color is obtained by three pixels in close proximity, each pixel containing different groups of nanoparticles emitting at the red (for example CdSe dots, CdSe rods, CdSe dot in CdS rod, ZnSe dot in CdS rod, CdSe/ZnS rods, InP dots, InP rods, CdSe/CdS rods, ZnSe/CdS . . . ), green (CdSe dots, CdSe rods, CdSe/ZnS rods . . . ) and blue (ZnSe, ZnS, ZnSe/ZnS core/shell dots or rods, CdS . . . ) wavelength range. Other color basis may also be realized as needed and more than three pixels of different colors in close proximity could also be used.

Figure 3A:
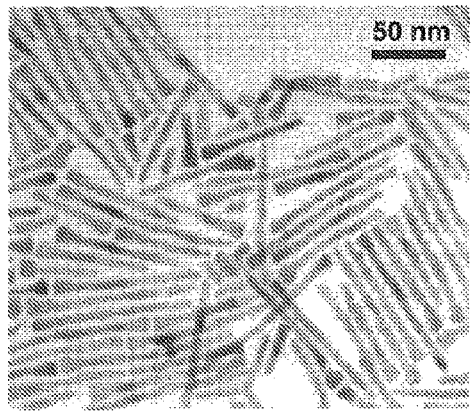
FIGS. 3A-3F are TEM images of various nanoparticles of the optically active media of the display device of the present invention.
Figure 3B:
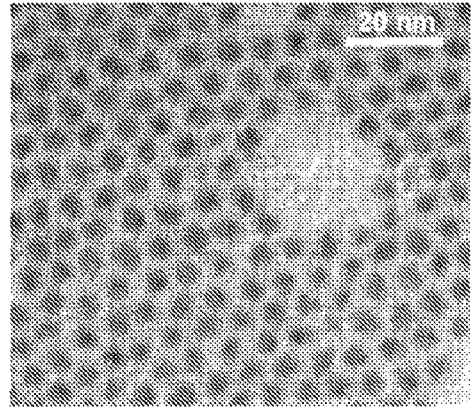
Figure 3C:
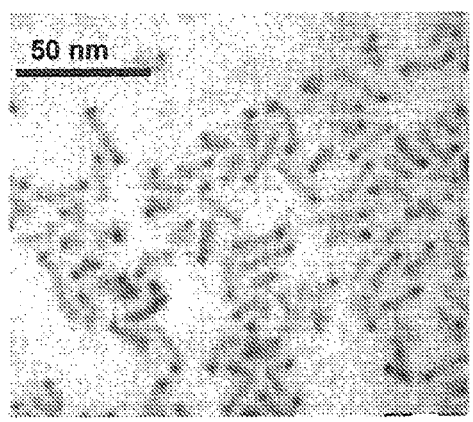
Figure 3D:
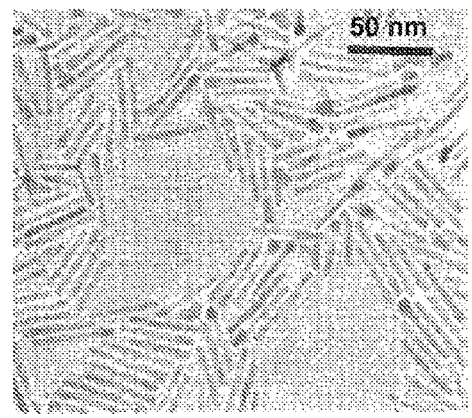
Figure 3E:
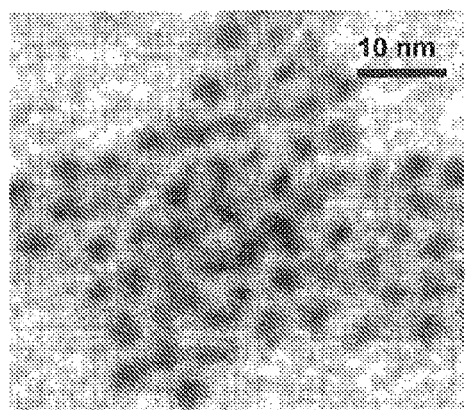
Figure 3F:
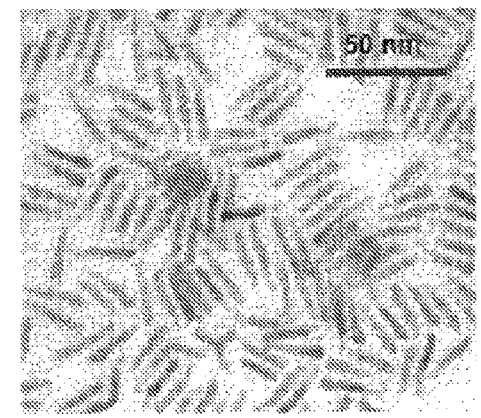

Reference is made to FIGS. 3A-3F, showing various types of nanoparticles that can be used to enable color tuning, differing in at least one of the following parameters: size, shape and/or material composition, which may be put in each pixel. Such various types of nanoparticles and their parameters are appropriately selected to thereby enable generation and emission with a certain wavelength range in each pixel. The nanostructures used in the optical display device may be prepared by wet chemical methods. FIGS. 3A-3F are Transmission Electron Microscopy (TEM) images of selected nanostructures according to the teachings of the present invention. More specifically, FIG. 3A illustrates 90 nm CdSe dot within CdS rods nanoparticles emitting at 610 nm; FIG. 3B illustrates 3.7 nm CdSe dots emitting at 590 nm; FIG. 3C illustrates 25 nm InP rods emitting at 730; FIG. 3D illustrates 50 nm ZnSe dots within CdS rods nanoparticles emitting at 590 nm; FIG. 3E illustrates 3.7 nm ZnSe dots emitting at 400 nm; FIG. 3F illustrates 25 nm CdSe/ZnS emitting at 620 nm.

Figure 4:
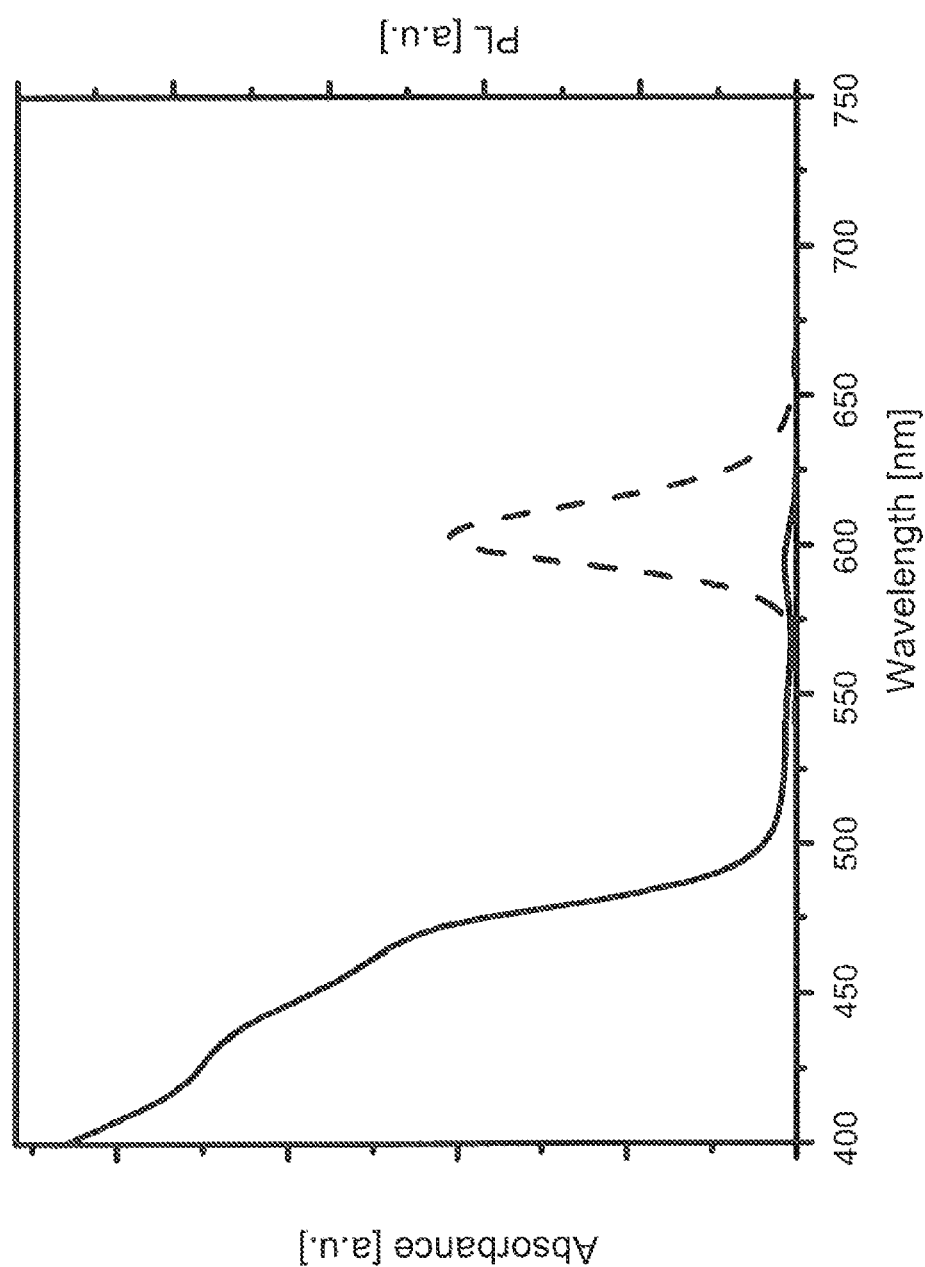
FIG. 4 represents absorption and photoluminescence of 60 nm CdSe dots within CdS rods nanoparticles.

Example of Absorption and Photo-Luminescence spectra of nanoparticles are shown in FIG. 4. FIG. 4 illustrates absorption (solid line) and photoluminescence (dashed line) of 60 nm CdSe dots within CdS rods nanoparticles. The photoluminescence feature is narrow (FWHM=about 25 nm). The absorption is continuous starting at the exciton (first peak at higher wavelength) and its optical density increases at lower wavelength. This enables the use of a wide range of backlight illuminations for different emission colors. Furthermore the emission peak is narrow and therefore enables high color contrast in the display.

Figure 5A:
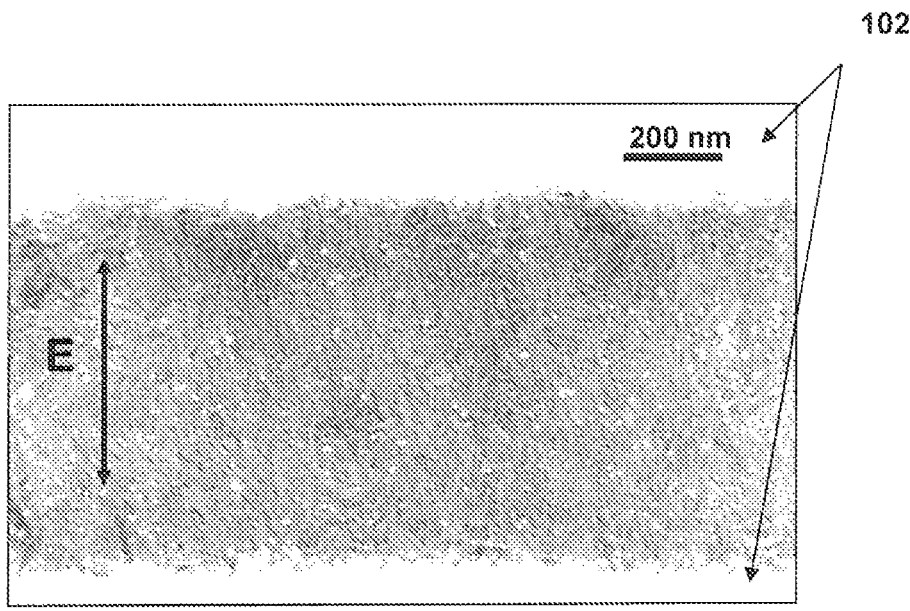
FIGS. 5A-5B represent rod alignment between electrodes, in particular
Figure 5B:
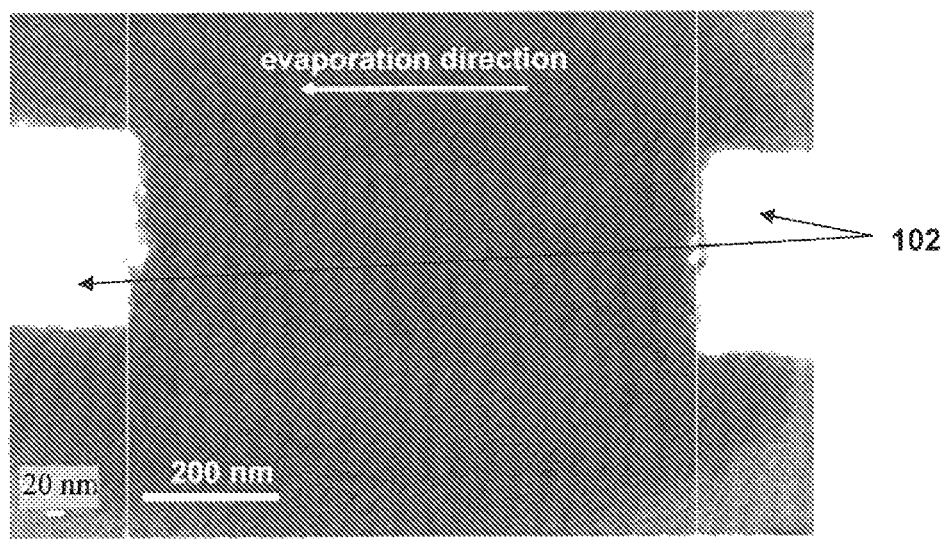

Reference is made to FIGS. 5A-5B illustrating rod alignment between electrodes. In particular, FIG. 5A is SEM image of rods aligned using AC electric field is shown. The surface of the substrate of the display is then coated with nanocrystals. In this specific example, the rods are 90 nm CdSe dots within CdS rods nanoparticles aligned between two gold electrodes 102. The electrodes 102 are the white stripes seen at the top and bottom of the picture. The electrodes may be made of gold using e-beam lithography (or optical lithography or other methods). The nanostructures are deposited on the region between electrodes using a self-assembly deposition technique. More specifically, a drop of a toluene solution containing CdSe dots within CdS rods nanoparticles is deposited on a silicon substrate and left to dry while applying AC voltage on the electrodes. Most of the rods align vertically to the electrodes' long axis direction and parallel to the direction of the electric field (black arrow) which is formed by applying AC voltage on the electrodes.

FIG. 5B is a SEM image of 40 nm CdSe rods aligned between two gold electrodes 102 using solvent evaporation. The rods align vertically to the electrodes and direction of solvent evaporation (white arrow). In this example, the alignment is performed using slow evaporation. A silicon substrate was inserted into a vial containing a solution of 40 nm CdSe rods dissolved in toluene. The solution slowly evaporates (about 4 days) leaving rods aligned on the surface of the substrate. The rods align in ribbons with their long axis (i.e. forming ribbon like structures) in the same direction of solution surface decent.

Another way to demonstrate rod alignment beside SEM is by measuring the degree of polarization of the emission from a pixel. It should be understood that since rod emission is polarized in the direction of its long axis, emission from an array of aligned rods emits polarized light.

In this connection, reference is made to FIGS. 6A-6D showing the polarized fluorescence of nanostructures due to alignment. The figures show CCD images of light emitted by an array of aligned CdSe dots within CdS rods nanoparticles using electric field with length of 90 nm on a silicon substrate taken with a polarizer placed before the CCD camera. The polarizer direction is indicated by the encircled white arrow.

Figure 6A:
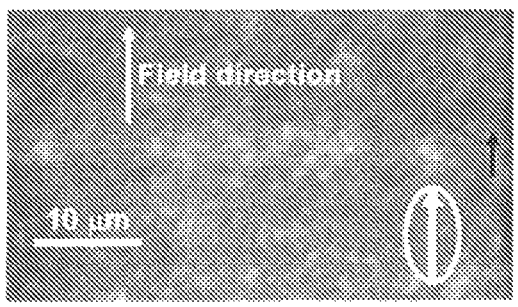
FIGS. 6A-6D show CCD images taken through a polarizer of light emitted by an array of aligned CdSe dots within CdS rods nanoparticles due to alignment.
Figure 6B:
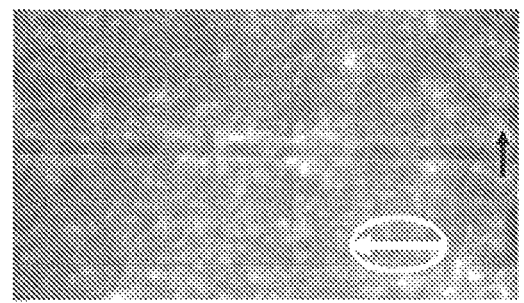

In particular, FIGS. 6A-6D pictures of CdSe dots within CdS rods nanoparticles fluorescence taken with a polarizer. The fluorescence of CdSe dots within CdS rods nanoparticles deposited on a silicon substrate using slow evaporation is measured. In FIG. 6A and FIG. 6B the rods are deposited on and in-between electrodes from a solution under application of electric field for alignment. The solution with rods is thus deposited on the entire surface of the substrate and following solvent evaporation rods align only in the gap between the electrodes where the field is applied. The alignment direction is marked by the black arrow and also referred to as the rods direction. Whiter areas indicate stronger fluorescence. While in FIG. 6A the gap area (region between the electrodes) is hardly observed, in FIG. 6B the gap is clearly noted (dark area in the middle) because the polarizer is perpendicular to the rods alignment. Therefore, the gap between the electrodes is darker (see FIG. 6B) when the polarizer is vertical to the general direction of the aligned rods (black arrow) in the gap. The intensity of the gap area in FIG. 6A is 30% brighter than that of FIG. 6B.

Figure 6C:
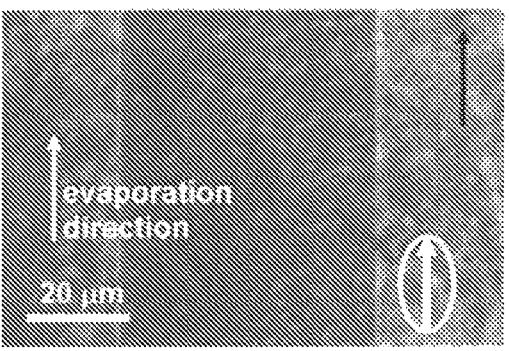
Figure 6D:
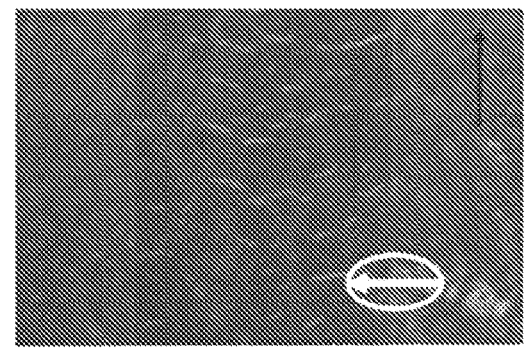

In FIG. 6C and FIG. 6D, the emission at the two perpendicular polarizations are compared from the same region of a substrate deposited with aligned rods using the evaporation method. In FIG. 6D where the polarizer is perpendicular to the rods direction, the entire area is darkened compared to the same area in FIG. 6C. The fluorescence intensity in FIG. 6C (polarization parallel to evaporation direction) is three times greater than that of FIG. 6D (polarization perpendicular to evaporation direction).

Figure 7A:
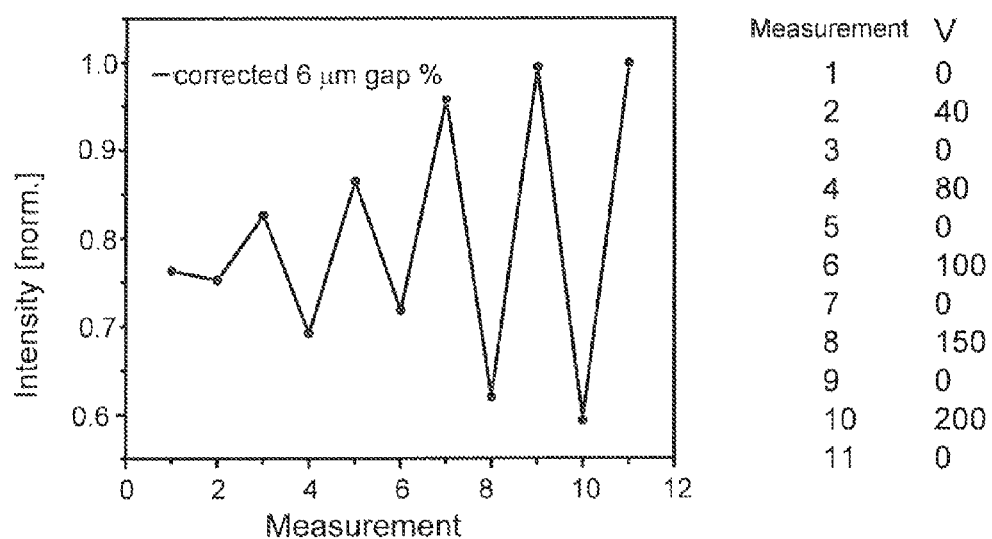
FIGS. 7A-7B represents modulation of CdSe dots within CdS rods nanoparticles fluorescence. In particular, in FIG. 7A is a graph representing photoluminescence intensity vs. a different DC voltage applied on the electrodes as indicated on the table and photoluminescence intensity is represented.
Figure 7B:
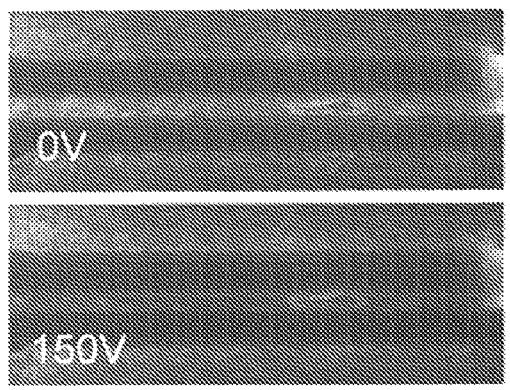

Reference is made to FIGS. 7A-7B illustrating the modulation of the fluorescence of the display device of the present invention. CdSe dots within CdS rods nanoparticles with length of 90 nm were aligned using AC voltage on a glass substrate. The rods align in the gap between the electrodes as seen in FIGS. 6A-6B. The rods are deposited between gold electrodes on a glass substrate. The gap between the electrodes is 6 μm. At each measurement a different DC voltage is applied on the electrodes as indicated on the table to the right. Photoluminescence intensity is corrected and normalized for degradation of the device. The degradation of the device is typically the decrease of the fluorescence emission when the pixel is in an operative state following successive modulations/switchings. Fluorescence intensity between "on" (no voltage applied) and "off" (voltage applied) situations change by more than 50% above 100 V.

FIG. 7B illustrates a fluorescence image of measurements 7 and 8.

Various display configurations are possible with vertical or in plane electrodes as described hereinbelow in connection with FIGS. 8-14. Additional layers (color filters, polarizer's . . . ) may be added on top of the active media region according to the display requirements. In each configuration, the active media region is excited by an input electromagnetic radiation. The active media region contains nanostructures that are modulated by an external electric field.

Figure 8:
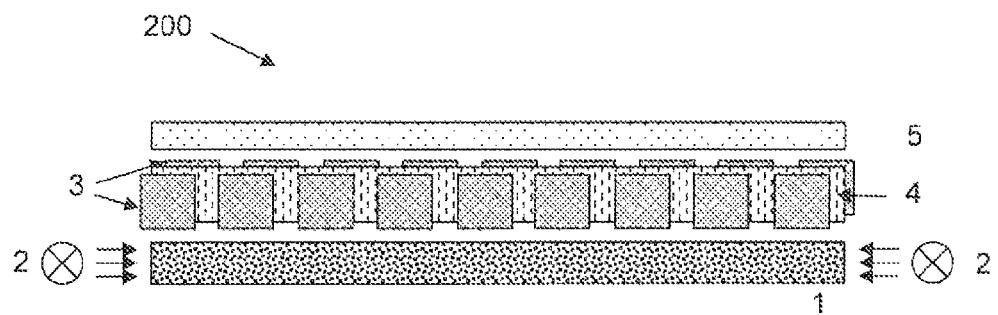
FIGS. 8-15 are different possible configurations of the arrangement of the display device of the present invention.

Reference is made to FIG. 8 illustrating an example of a possible configuration of the display device of the present invention. In this configuration, the display device 200 is illuminated by a backlight diffuser 1 for UV light distribution, a UV source, e.g. a UV fluorescent lamp or an LED 2. The display device 200 comprises at least a pair of electrodes 3 (e.g. a structured electrodes arrangement), an active media region 4 (e.g. light emitter film containing light emitting nanoparticles such as nanorods), and a protective layer 5, which is transparent in the visible range and reflective or absorbing in the UV range.

Figure 9:
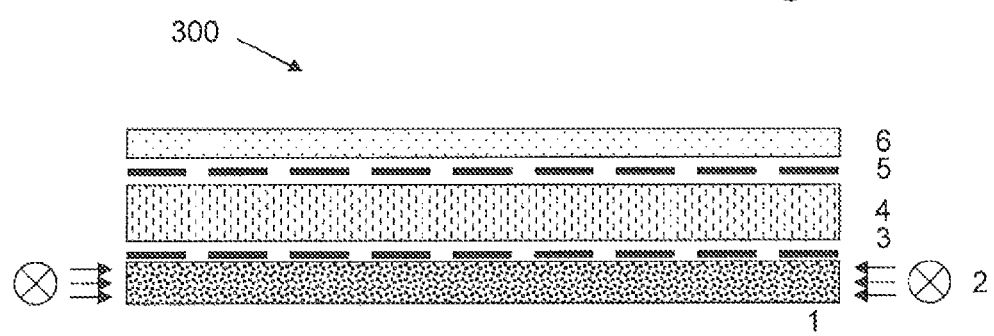

Reference is made to FIG. 9 illustrating an example of a possible configuration of the display device of the present invention. In this configuration, the display device 300 is illuminated by a backlight diffuser 1 for UV light distribution, a UV source, e.g. a UV fluorescent lamp or an LED 2. The display device 300 comprises at least a pair of electrodes 3 and 5 (e.g. a structured electrodes arrangement), an active media region 4 (e.g. light emitter film containing light emitting nanorods), and a layer 6, which is transparent in the visible range and reflective or absorbing in the UV range. The electrodes 3 and 5 may be a transparent to transmit electromagnetic radiation propagation.

Figure 10:
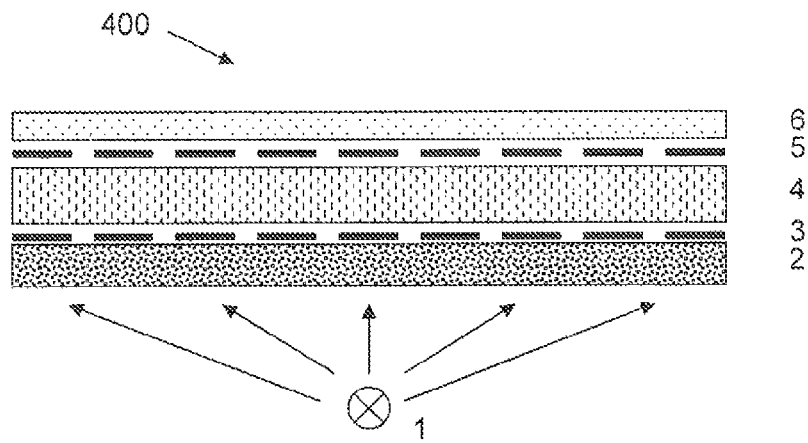

Reference is made to FIG. 10 illustrating an example of a possible configuration of the display device of the present invention. In this configuration, the display device 400 is illuminated by UV light source 1 like a UV emitting fluorescent lamp or a LED 1 and a light diffuser 2 for UV light distribution. The display device 400 comprises at least a pair of electrodes 3 and 5 (e.g. a structured electrodes arrangement), an active media region 4 (e.g. light emitter film containing light emitting nanorods), and a layer, which is transparent in the visible range and reflective or absorbing in the UV range 6.

Figure 11:
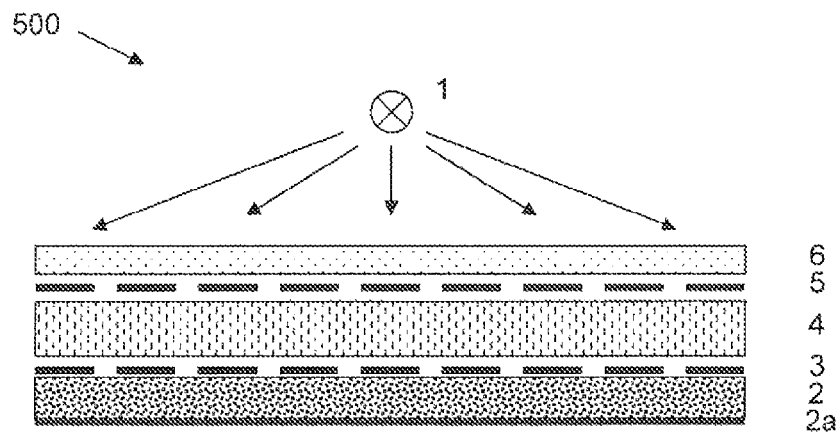

Reference is made to FIG. 11 illustrating an example of a possible configuration of the display device of the present invention. In this configuration, the display device 500 is illuminated by UV light source 1 like a UV emitting fluorescent lamp or a LED 1 illuminating the display device 500 from the front side, and a light diffuser 2 for UV light distribution layer on the backside. The UV distribution layer is coated with a light reflector 2a. The display device 500 comprises at least a pair of electrodes 3 and 5 (e.g. a structured electrodes arrangement), an active media region 4 (e.g. light emitter film containing light emitting nanorods), and a layer 6, which is transparent in the visible range and reflective or absorbing in the UV range.

Figure 12:
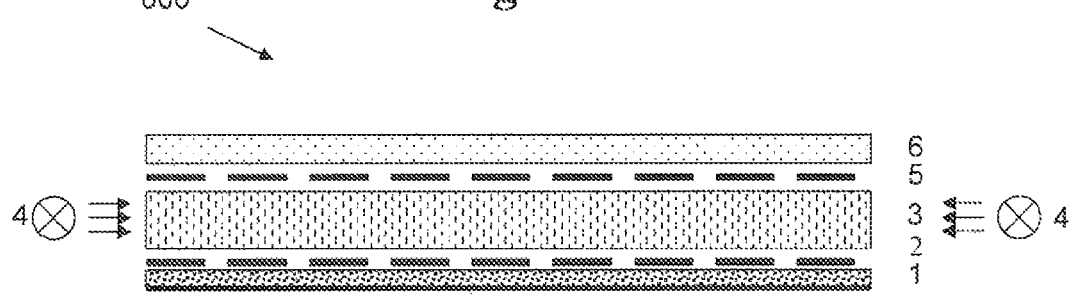

Reference is made to FIG. 12 illustrating an example of a possible configuration of the display device of the present invention. In this configuration, the display device 600 is illuminated by a reflective backlight diffuser 1 for light distribution and reflection of the photon emission emitted by the nanoparticles. The display device 600 comprises structured electrodes 2 and 5, an active media region 3 (e.g. light emitter film containing light emitting nanorods), a UV source e.g. a UV fluorescent lamp or an LED 4, emitting UV light into the nanostructure containing region 3, and a layer 6, which is transparent in the visible range and reflective or absorbing in the UV range.

Figure 13:
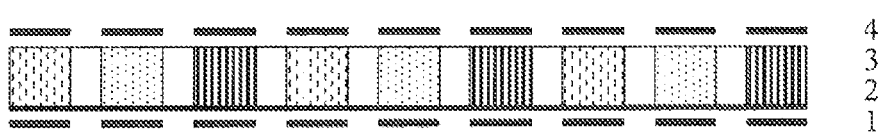

Reference is made to FIG. 13 illustrating an example of a possible configuration of the display device 700 of the present invention. In this configuration, the active media 3 (e.g. light emitting film containing nanorods) is enclosed between the two structured electrodes 1 and 4 is structured in such a way, that each electrode pair is addressing an region of the active media, which may contain nanoparticles of a specified size corresponding to a specific wavelength range (e.g. light color). The addressed region of the active media emits to form a colored matrix emission. The structured active media 3 may be arranged on a transparent carrier film 2.

Figure 14:
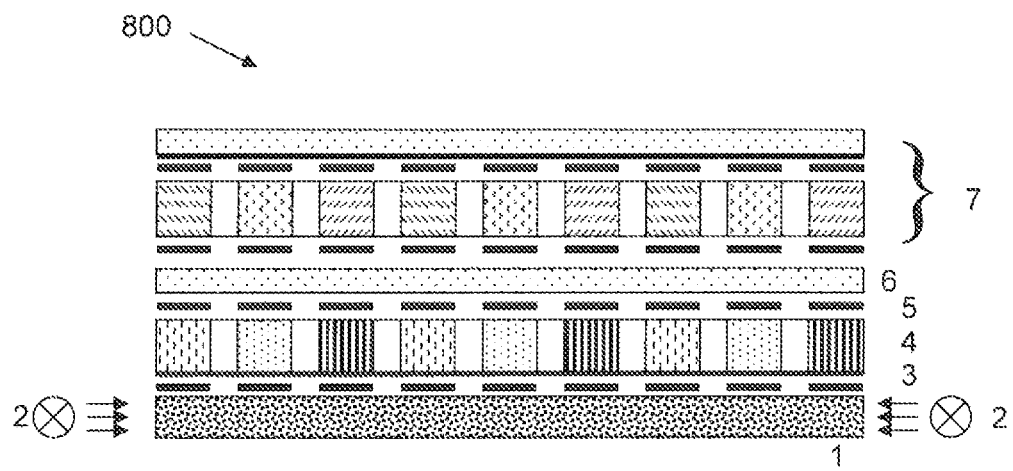
Figure 15:
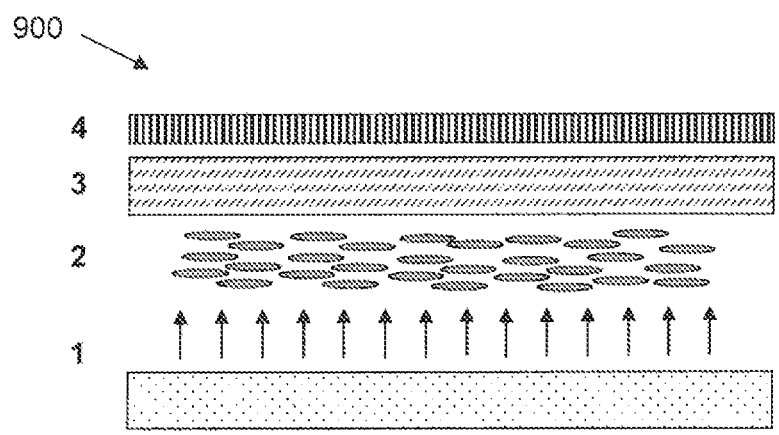

Reference is made to FIG. 14 illustrating an example of a possible configuration of the display device of the present invention. In this configuration, the display device 800 is illuminated by a backlight diffuser 1 for UV light distribution, a UV source, e.g. a UV fluorescent lamp or an LED 2, and comprises structured electrodes 3 and 5, an active media 4 (e.g. structured region) and a layer 6, which is transparent in the visible range and reflective or absorbing in the UV range, followed by a liquid crystals (LC) layer 7 (e.g. conventional active or passive matrix liquid crystal display). The display device 800 is operable as a polarized backlight source for the liquid crystal layer 7. The liquid crystal layer 7 is located at the electromagnetic propagation output of the pixel arrangement, defined by the active media 4 enclosed between the electrodes 3 and 5. The liquid crystal layer 7 is configured and operable to modulate transmission of the modulated photon emission from the active media 4. The pixel arrangements of the active media 4 and of the liquid crystal layer 7 are arranged in such a way that the color of the generated/emitted light corresponds to the color of the pixel of the liquid crystal layer 7. Using this configuration enables to provide a high contrast ratio as compared to existing liquid crystal displays Reference is made to FIG. 15 illustrating an example of a possible configuration of the display device of the present invention. In this configuration, the optical display device 900 is exposed to backlight 1. The display device 900 comprises an active media 2 forming the pixel arrangement and a liquid crystal arrangement 3. Possible polarizer and/or filter may be placed on top of the active media 2 (between the active media region 2 and the arrangement of the liquid crystals 3).

The active media 2 comprises at least one region of nanostructures operable as an optically active media. The nanostructures, as being an optically active media are responsive to input electromagnetic radiation to generate output electromagnetic radiation. The nanostructures have a rod-like geometrical shape (e.g. nanorods), and accordingly are responsive to input electromagnetic radiation which may be randomly polarized, to generate output electromagnetic radiation of a specific polarization.

The output polarized electromagnetic radiation is the output of at least one pixel element of the display device. The active media 2 is thus operable as a polarized light source. The active media 2 may be further formed by nanorods assembled on a substrate with a certain alignment (orientation) with respect to the electric field, thus improving the contrast of the emitted radiation.

In this specific example of FIG. 15, the liquid crystal arrangement 3 comprises at least one liquid crystal layer located at the propagation of the electromagnetic radiation output of at least one pixel element. The LC layer 3 forms an LC modulator screen arrangement. The LC arrangement is configured and operable to modulate the transmission of the polarized electromagnetic radiation from said region of nanostructures 2. The LC layer may thus be used as a modulator to provide for example modulated light propagation conditions of the photon emission for the pixel element. The LC layer is operable as a light modulator, while the nanostructure arrangement presents a polarized pixelized light source for such LC modulator. Thus, one or more layers of liquid crystals (LC's) are deposited on top of the active media 3 region. After the exposition of the nanorods 2 to input electromagnetic radiation (backlight 1), the nanorods 2 generate output polarized electromagnetic radiation (polarized light) that is modulated i.e. blocked, partially blocked or transmitted by the LC arrangement 3. An additional polarizer 4 may optionally be provided. In this connection, it should be understood that according to the teachings of some embodiments of the present invention, the LC arrangement can be used being configured to receive the electromagnetic radiation output generated and emitted by the nanostructures-based active media. The nanostructures region is thus located upstream (before or below) the LC arrangement with respect to the backlight propagation. Accordingly, the input of the LC arrangement is the emission of the nanostructure region (and not a backlight transmitted through a polarizer). This results in that the output of the display device is significantly brighter than in conventional display devices using the same intensity of electromagnetic radiation exposition.

Figure 16A:
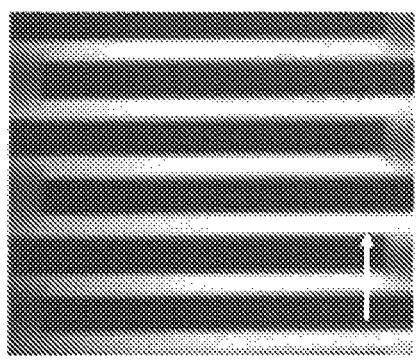
FIGS. 16A-16B are CCD images taken through a polarizer of light emitted by an array of aligned CdSe dots within CdS rods nanoparticles.
Figure 16B:
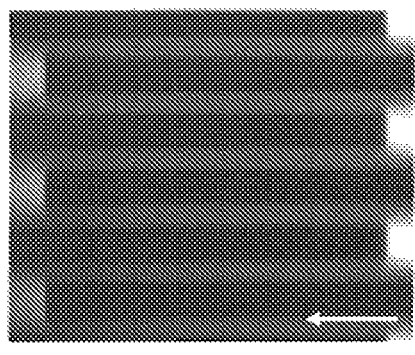

As described before, according to the teachings of the present invention, the nanostructures may be aligned with a specific orientation with respect to the electric field vector generated between the electrodes. The alignment of the nanostructures may be performed by using an external field such as DC or AC electric field. In this connection, reference is made to FIGS. 16A-16B illustrating alignment of nanostructures (in this example nanorods) by using an external AC electric field. Here 60 nm CdSe/CdS red emitting nanostructures dissolved in toluene are drop-casted on comb-type electrodes with a gap of 15 μm. While the drop evaporates a sinusoidal waveform of 8 $V_{rms}$/μm at 50 kHz, is applied on the electrodes.

FIGS. 16A-16B are CCD images taken through a polarizer (the polarizer is placed before the CCD camera) of the polarized electromagnetic radiation (e.g. fluorescence) generated by an array of aligned CdSe dots within CdS rods nanoparticles. The polarizer direction is indicated by a white arrow. The alignment direction of the nanostructures is marked by a black arrow and is referred to as the rods direction. The electrodes appear as black rectangulars.

In FIG. 16A, the polarizer is placed parallel to the rods alignment (i.e. general direction of the aligned rods), resulting in the transmission of the output radiation generated by the nanostructures by the polarizer, shown by the bright areas between the electrodes. Whiter areas indicate stronger fluorescence.

In FIG. 16B, the polarizer is placed perpendicular to the rods alignment, resulting in the blocking of the output radiation generated by the nanostructures by the polarizer, shown by the gray areas between the electrodes.

The intensity of the gap area in FIG. 16A is 4.7 times brighter than that of FIG. 16B. The concentration of nanorods between the electrodes is more than 2 OD (Optical Density).

In this example, a solution containing nanostructures is drop-cast on the substrate. Under application of electric field, the nanostructures align according to the electric field vector generated between the electrodes.

As described above, the nanostructures are affectable by an external electric field to selectively modulate emission of output electromagnetic radiation. The external field may be DC or AC electric field. When an AC electric field is used, additional parameters such as frequency and modulation mode (e.g. sinusoidal, square, triangle, pulse etc.) have to be defined (different signals would lead to different switching responses).

Figure 17:
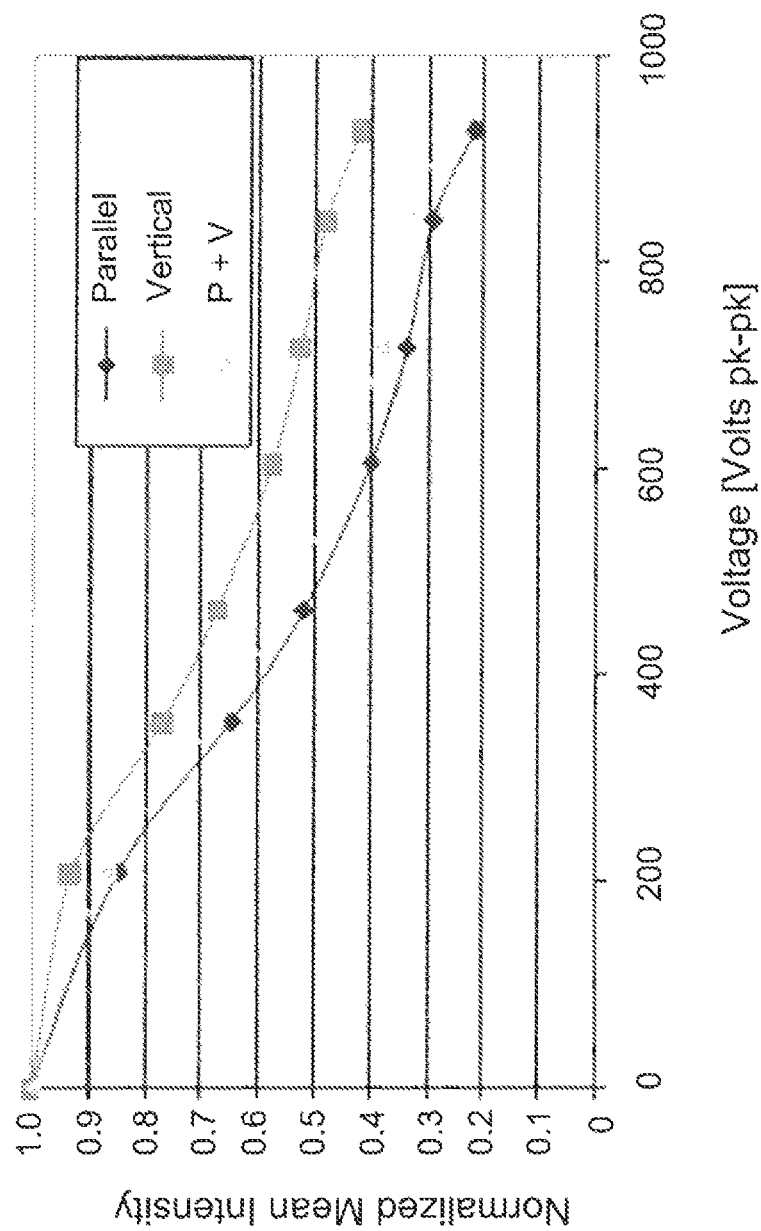
FIG. 17 represents a fluorescence mean intensity of 27 nm green emitting CdSe/CdS nanorods versus voltage.

Reference is made to FIG. 17 showing fluorescence mean intensity (normalized) vs. voltage for a square waveform AC voltage. FIG. 17 shows that the intensity (nanorods fluorescence intensity) gradually decreases with AC voltage increase. In this example, the fluorescence of 27 nm green emitting CdSe/CdS nanorods is measured while applying 2 kHz square signal. The nanorods were drop-casted on comb-type electrodes with a gap of 10 μm.

The polarization ratio (PR), which is the ratio between the fluorescence intensity measured inside the electrodes' region when the polarizer is parallel to rod direction to that measured when the polarizer is vertical to rod direction, was three. The intensity gradually decreases with voltage increase. In FIG. 17, the fluorescence intensity decrease is measured for both configurations of polarization: parallel polarization (diamond points) when the polarizer is parallel to nanorods direction and vertical polarization (square points) when the polarizer is vertical to the nanorods direction. In the parallel configuration, fluorescence intensity decreases by 78% when the voltage is raised to 950 V (pk-pk) and in the vertical configuration fluorescence intensity decreases by 58% when the voltage is raised to 950 V (pk-pk). The total intensity being the weighted average of a single polarization intensity modulation decreases by 72%, because the initial polarization ratio is three. The total fluorescence intensity decrease shows that nanorods interaction with the applied electric field is stronger in the parallel configuration.

Figure 18:
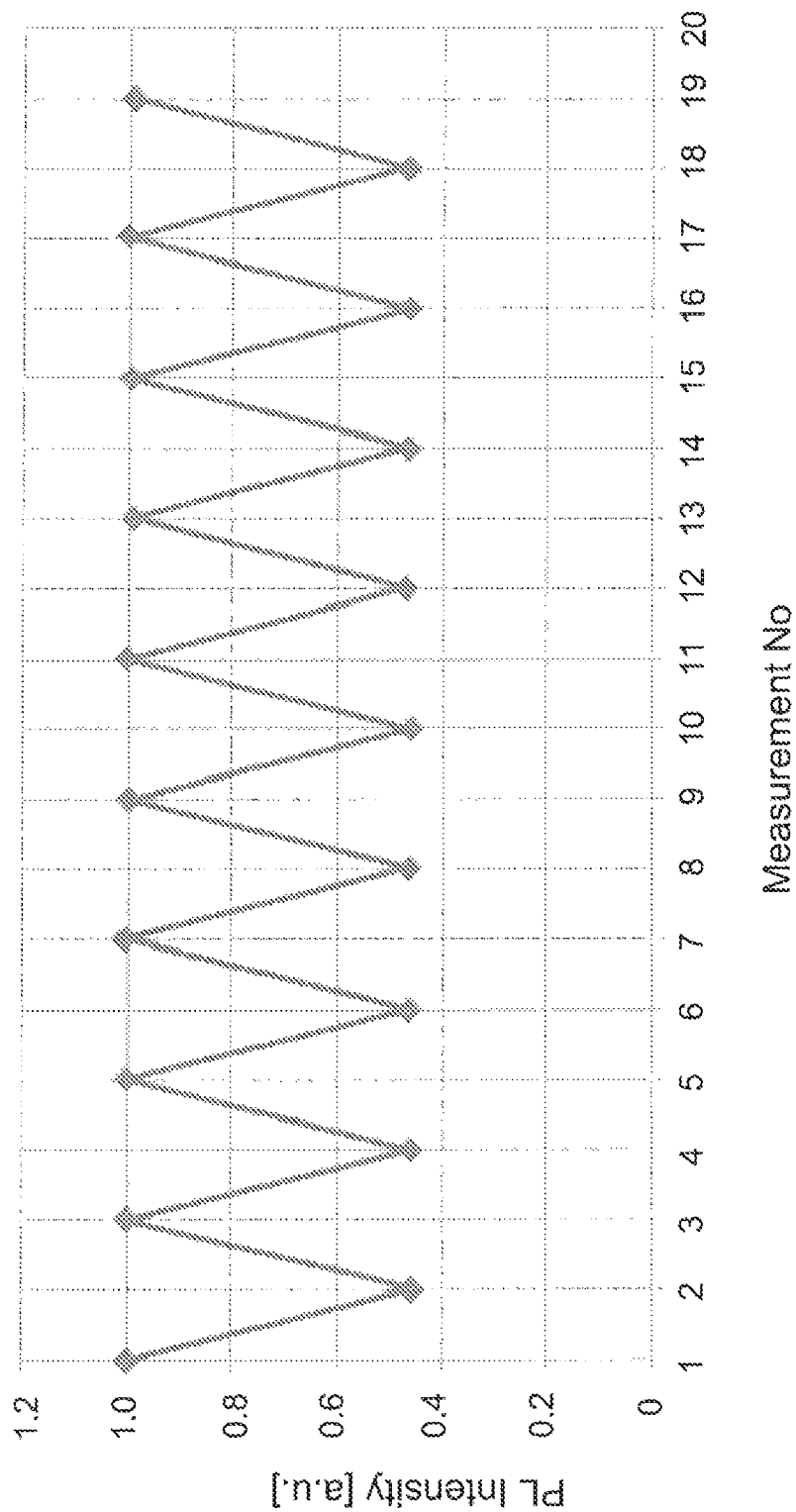
FIG. 18 represents fluorescence intensity at several successive modulation measurements of 75×5.5 nm CdSe/CdS rods using 400V pk-pk AC at 8 kHz.

Fluorescence intensity modulation was also measured at multiple successive measurements to prove repeatability. FIG. 18 shows repeated emission modulation between high and low intensities of 75×5.5 nm CdSe/CdS rods using 400V pk-pk AC voltage of 8 kHz. The patterned electrode type has a rectangular form with a gap of 5 μm. PR ratio in this example is 1.2. The switching intensity of 54% was found to be repeatable for more than nineteen measurements.

Using an AC electric field instead of a DC electric field enables the possibility of controlling the signal shape (waveform) and the frequency parameter of the AC voltage. It should be understood that, a sinusoidal waveform Modulation having smaller modulation depth than an AC signal square-like waveform modulation, using a sinusoidal waveform instead of a square-like waveform, implies that during one cycle the nanorods are affected with lower field's value. Changing a 420 $V_{pp}$ 2 kHz sinusoidal waveform signal to a square waveform improves the measured switching level from 20% to 32% respectively. The square-like waveform refers to a waveform modulation having a higher modulation depth than an AC signal having a sinusoidal waveform.

It should be understood that when a single polar electric field (e.g. DC) is used to selectively modulate emission of output electromagnetic radiation from the nanostructure region, a nanostructure can migrate between the electrodes. Using alternating polarity electric field (AC) enables to solve this problem.

Moreover, as described above, a sinusoidal waveform input electrical signal is less efficient than a square-like waveform signal since the electric field in the sinusoidal waveform signal is not at its maximal values for prolonged times. Since the response time of the modulation is of the orders of microseconds and even faster, in particular in the vicinity of the zero crossing regions of the electrical input signal, the output electromagnetic radiation is not switched off efficiently.

When an electric field is applied at maximal value during the majority time of the cycle, the maximal light attenuation is preserved while still not compromising the nanostructure migration effects.

However, the transition between the two polarities of an electric field takes a finite time due to the RC constant of the effective capacitor-resistance of the pixel. Therefore, the transition time may be minimalized in comparison with the cycle time of the input electrical signal by using for example fast electronics. Alternatively, the electric driving cycle time may be made longer. However, long cycle times diminish the migration cancellation of the polarity switching setting a time limit of the cycle period. The rate of the electric field applied to the active media region should be much quicker (e.g. 50 kHz) from the display rate (i.e. refresh rate) (e.g. 120 Hz).

Figure 19:
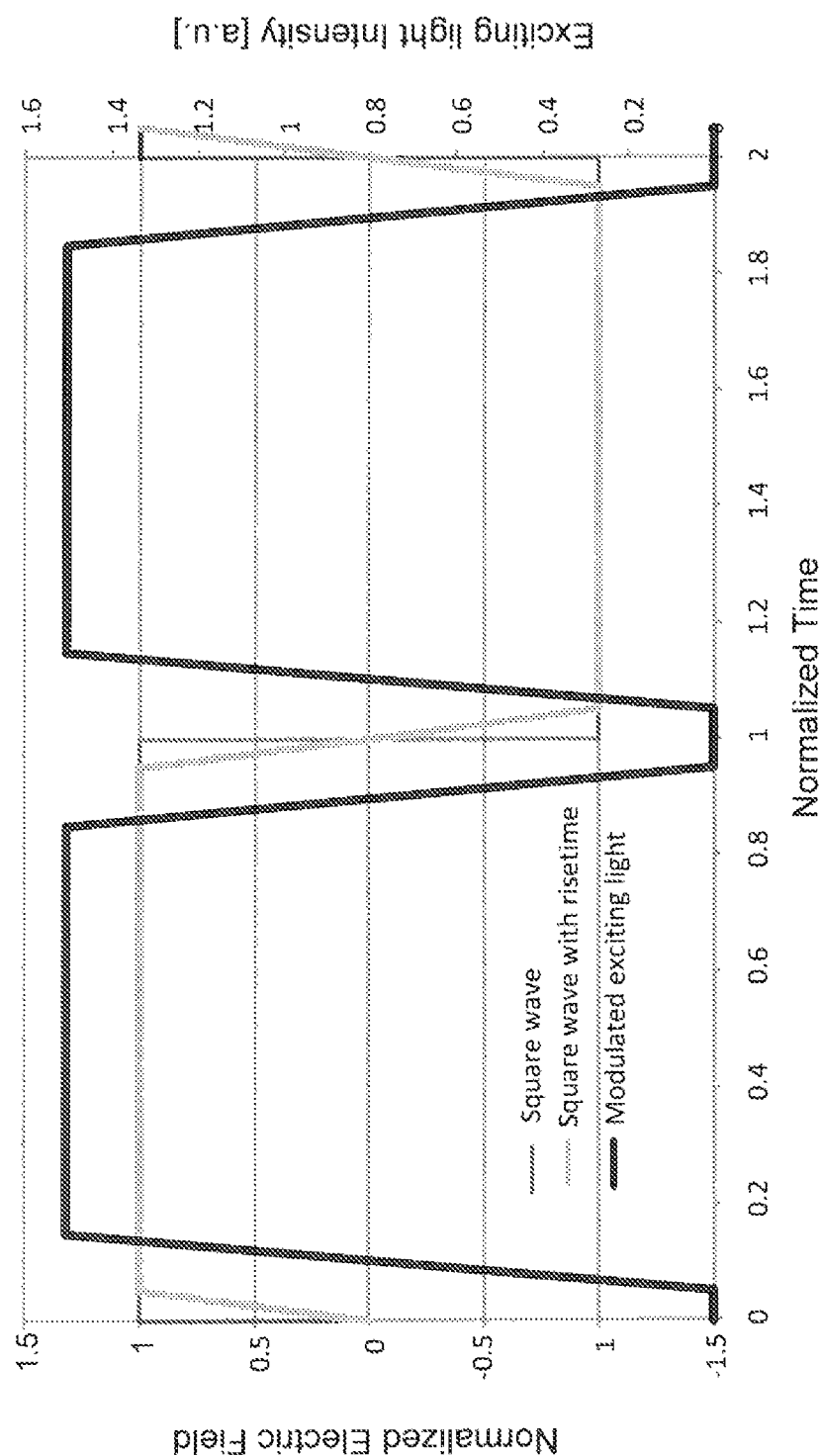
FIG. 19 represents synchronization between an input electromagnetic radiation and an electrical field affecting the active media of the present invention.

In some embodiments, the input electromagnetic radiation is modulated and the period of the modulation of the input electromagnetic radiation is synchronized with the period of the AC voltage. More specifically, the input electromagnetic radiation may be modulated such the input electromagnetic radiation is switched off when the electric field signal crosses the zero axis as illustrated in FIG. 19. Reference is made to FIG. 19 representing the synchronization between the periods of the input electromagnetic radiation (indicated by modulated exciting light) and the external electric field (indicated by square wave) affecting the active media of the present invention.

The fluorescence intensity degradation was also improved by using an AC signal. For a frequency of 8 kHz, the fluorescence intensity degradation was low (below 1.1%). Similarly, frequencies above 200 Hz produce very weak degradation signatures.

Fluorescence modulation was also observed for non-aligned nanorod films. Typically, fluorescence modulation for non-aligned nanorod films was 50%-60% less than that of aligned films.

In some embodiments, there is provided a polymer carrier surrounding the nanostructures to protect them from the environment. The polymer carrier may encapsulate the nanostructures. In a typical encapsulation procedure, a polymer solution was spin coated on the nanorods film at 1000-4000 rpm for 10-60 seconds. A typical polymer layer thickness is 100-1000 μm. Encapsulation prevents nanorods oxidation, improves stability and durability. Alternatively, the polymer may be molded in the film using an appropriate molder. In this case, polymer final thickness is determined by the amount of polymer solution inserted into the mold. The polymer is then cured by evaporation of solvent with or without heat, irradiation with UV light, initiation materials or other. Using mold assisted encapsulation enables unlimited thickness of polymer encapsulation.

The invention claimed is:

1. An optical display device comprising:
   at least one region of nanostructures operable as an optically active media, such that said nanostructures are responsive to input electromagnetic radiation to emit output electromagnetic radiation, and
   an arrangement of electrodes being configured and operable to be selectively addressable to create an external electric field to said at least one region of nanostructures, said at least one region of nanostructures and said arrangement of electrodes defining together a pixel arrangement of said display device;
   said external electric field affecting said at least one region of nanostructures to selectively modulate emission of said output electromagnetic radiation, the modulated output electromagnetic radiation being an output of at least one pixel element of the pixel arrangement display device; said pixel arrangement carrying out selective wavelength conversion and spatial modulation of the input electromagnetic radiation at a specific addressed pixel in accordance with an image to be displayed.

2. The display device of claim 1, wherein said pixel arrangement comprises an array of spaced-apart regions of nanostructures.

3. The display device of claim 2, wherein the at least one region of nanostructures differs from neighboring regions by at least one of size, material composition, geometrical shape of the nanostructures resident in said region and a wavelength of the emitted output radiation.

4. The display device of claim 1, wherein said nanostructures comprise at least one of colloidal nanocrystals, anisotropic nanoparticles, isotropic nanoparticles, semiconductor nanostructures.

5. The display device of claim 4, wherein said anisotropic nanostructures are aligned with a specific orientation with respect to each other or with respect to the electric field vector generated between the electrodes, said specific orientation being substantially parallel or perpendicular to the electric field vector generated between said electrodes.

6. The display device of claim 1, wherein said at least one region of nanostructures comprises at least one nanostructure having at least one asymmetrical property affecting said emitted output electromagnetic radiation; said asymmetrical property comprising at least one property selected from asymmetric geometrical shape and heterogeneous material distribution, said asymmetric geometrical shape being selected from rod-like, round, elliptic, pyramidal, disk-like, branch and network.

7. The display device of claim 1, wherein said external electric field is selected from a DC voltage and an AC voltage affecting said region of the nanostructures.

8. The display device of claim 7, wherein said AC voltage is selected from square-like and sinusoidal waveform.

9. The display device of claim 1, wherein said region of nanostructures is arranged in between said arrangement of electrodes.

10. The display device of claim 1, wherein said arrangement of electrodes comprises a pair of electrically conductive layers, at least one of said electrically conductive layer being patterned to define an array of spaced-apart electrodes corresponding to an array of pixels.

11. The display device of claim 1, comprising a liquid crystal (LC) arrangement located at electromagnetic propagation output of said pixel arrangement, said LC arrangement being configured and operable to modulate transmission of the modulated photon emission from said region of nanostructures.

12. The display device of claim 4, wherein said semiconductor nanostructures are selected from elements of Group II-VI, Group III-V, Group IV-VI, Group III-VI, Group IV semiconductors and alloys and/or combinations thereof, wherein said semiconductor nanostructures are selected from elements of Group II-VI material said semiconductor nanostructures are selected from CdSe, CdS, CdTe, ZnO, ZnSe, ZnS, ZnTe, HgS, HgSe, HgTe, CdZnSe and any combination thereof, wherein said semiconductor nanostructures are selected from elements of Group III-V material said semiconductor nanostructures are selected from InAs, InP, InN, GaN, InSb, InAsP, InGaAs, GaAs, GaP, GaSb, AlP, AlN, AlAs, AlSb, CdSeTe, ZnCdSe and any combination thereof, wherein said semiconductor nanostructures are selected from elements of Group IV-VI, said semiconductor nanostructures are selected from PbSe, PbTe, PbS, PbSnTe, $Tl_2SnTe_5$ and any combination thereof.

13. The display device of claim 12, wherein the semiconductor nanostructure is a heterostructure of at least two different semiconductors in a core/shell configuration having at least one shell.

14. The display device of claim 13, wherein the heterostructure is selected from the following configurations: a first semiconductor material or alloy thereof shaped like a dot and located inside at least one shell having an elongated shape and being made of a different semiconductor material or alloy thereof.

15. A method for use in displaying an image comprising:
    providing nanostructures capable of emitting electromagnetic radiation with a predetermined number of wavelength ranges upon excitation by certain input electromagnetic radiation;
    exciting said nanostructures by the input electromagnetic radiation to thereby generate the electromagnetic radiation of said predetermined number of wavelength ranges;
    selectively applying an external electric field to at least a region of said nanostructures thereby selectively enabling modulation of the generated electromagnetic radiation, thus providing modulation of the input electromagnetic radiation at a specific addressed pixel in accordance with an image to be displayed.

16. The method of claim 15, wherein said selectively applying an external electric field comprises applying at least one of a DC voltage or an AC voltage to said at least one region of the nanostructures.

17. The method of claim 16, wherein said applying an AC voltage to said at least one region of the nanostructures comprises controlling frequency and waveform parameters of said AC voltage, said controlling frequency and waveform parameters of said AC voltage comprises applying an AC voltage having a square-like waveform.

18. The method of claim 15, wherein said exciting of said nanostructures by the input electromagnetic radiation comprises at least one of periodically modulating the amplitude of the input electromagnetic radiation as a function of time, and illuminating said nanostructures by using back illumination.

19. The method of claim 18, comprising synchronizing the period of the modulated input electromagnetic radiation with the period of said AC voltage.

20. The method of claim 15, wherein said providing of the nanostructures comprises at least one of: selecting at least one nanostructure parameter of size, shape and material composition, to thereby enable emission with a certain wavelength range in each pixel; selecting different groups of nanostructures emitting at respectively the red wavelength range, the green wavelength range and the blue wavelength range, each group forming a different pixel and arranging at least three pixels in close proximity; appropriately configuring at least one of geometrical shape and heterogeneous material composition of the nanostructures to provide nanostructures having asymmetrical property; depositing emitting nanostructures of various types in a pre-defined arrangement between at least region of electrodes enclosing said nanostructures; providing a polymer carrier surrounding said nanostructures, and aligning said nanostructures.

21. The method of claim 15, wherein said applying of the electric field comprises operation of at least region of electrodes enclosing said nanostructures between them.

22. The method of claim 21, wherein said region of electrodes is provided by patterning a substrate to form at least one array of spaced-apart electrodes corresponding to an array of pixels.

23. The method of claim 20, wherein said aligning said nanostructures comprises aligning said nanostructures substantially parallel to the external field.

24. An optical display device comprising:
at least one region of nanostructures operable as an optically active media, said nanostructures being anisotropic; said nanostructures are aligned with a specific orientation with respect to each other such that said nanostructures are responsive to input electromagnetic radiation to emit output polarized electromagnetic radiation, said output polarized electromagnetic radiation being an output of at least one pixel element of the display device; and;
a liquid crystal (LC) arrangement located at propagation of the electromagnetic radiation output of said at least one pixel element; said LC arrangement being configured and operable to modulate transmission of the polarized electromagnetic radiation from said region of nanostructures and to thereby induce modulation of the polarized photon emission.

25. The display device of claim 1, wherein said external electric field affects said at least one region of nanostructures to selectively quench emission of said output electromagnetic radiation.

* * * * *